US008744652B1

(12) United States Patent
Nishinaga et al.

(10) Patent No.: US 8,744,652 B1
(45) Date of Patent: Jun. 3, 2014

(54) METHOD AND APPARATUS FOR CONTROLLED BRAKING IN FIXED GUIDEWAY TRANSPORTATION SYSTEMS

(75) Inventors: Eugene Iwao Nishinaga, San Rafael, CA (US); Harry Burt, Concord, CA (US)

(73) Assignee: Cybertran International Inc., Richmond, CA (US)

( * ) Notice: Subject to any disclaimer, the term of this patent is extended or adjusted under 35 U.S.C. 154(b) by 0 days.

(21) Appl. No.: 13/316,398

(22) Filed: Dec. 9, 2011

Related U.S. Application Data

(63) Continuation-in-part of application No. 13/218,422, filed on Aug. 25, 2011, and a continuation-in-part of application No. 13/218,423, filed on Aug. 25, 2011, and a continuation-in-part of application No. 13/218,429, filed on Aug. 25, 2011, and a continuation-in-part of application No. 13/218,434, filed on Aug. 25, 2011, now Pat. No. 8,554,397.

(60) Provisional application No. 61/459,247, filed on Dec. 10, 2010.

(51) Int. Cl.
*G06F 7/00* (2006.01)
*G06G 7/76* (2006.01)
*B61H 13/28* (2006.01)
*B61C 17/12* (2006.01)
*B60T 8/26* (2006.01)
*B60T 8/17* (2006.01)
*B60T 8/32* (2006.01)
*B60T 13/66* (2006.01)
*B61H 9/00* (2006.01)

(52) U.S. Cl.
CPC ............. *B60T 8/1705* (2013.01); *B60T 8/3235* (2013.01); *B60T 13/665* (2013.01); *B61H 9/006* (2013.01)
USPC ................. 701/20; 701/19; 701/70; 701/93; 188/38; 246/182 R; 303/128

(58) Field of Classification Search
USPC ........... 701/19, 96, 20, 301, 93, 24, 118, 117, 701/70; 104/124, 282, 284, 285, 283, 286, 104/294, 292, 290, 88.02, 23.2, 155; 180/169, 170; 188/38, 41, 162, 170; 246/122 R, 167 D, 28 R, 182 R, 121, 1 R, 246/5, 4; 342/71; 340/479, 436, 467; 303/7, 303/123, 28, 118.1, 132, 15, 146; 105/30, 105/64.2, 1.4
See application file for complete search history.

(56) References Cited

U.S. PATENT DOCUMENTS 3,819,932 A * 6/1974 Auer, Jr. et al. ............... 246/1 R
(Continued)

OTHER PUBLICATIONS

Nishinaga, E.I., et al., "A Vehicle Collision Avoidance System Using Time Multiplexed Hexadecimal FSK", Boeing Aerospace Company, IEEE/Vehicular Technology Conference, vol. 33, 1983, pp. 171-182.
(Continued)

*Primary Examiner* — Helal A Algahaim
*Assistant Examiner* — Dale W Hilgendorf
(74) *Attorney, Agent, or Firm* — Pillsbury Winthrop Shaw Pittman LLP

(57) ABSTRACT

The present invention relates generally to ground transportation systems, and more particularly to a fixed guideway transportation system that achieves a superior cost benefit ratio, is lower in net present cost and thus more easily justified for lower density corridors, and can provide passenger carrying capacities appropriate for higher density corridors serviced by mass rapid transit systems today. According to certain aspects, the present invention provides a braking control system and methodology that enables the implementation of related systems and methods that achieve safe headways at higher speeds than conventionally possible, while maintaining collision avoidance capabilities that support necessary MTBH criteria. In embodiments, a brake assembly for an axle of a vehicle provides redundancy and load-sharing such that failures are guaranteed to not occur above required safety criteria.

15 Claims, 3 Drawing Sheets

(56) References Cited

U.S. PATENT DOCUMENTS

| | | | | |
|---|---|---|---|---|
| 3,924,902 | A | * | 12/1975 | Engle .................... 303/132 |
| 3,964,702 | A | * | 6/1976 | Lardennois et al. ............ 246/4 |
| 3,970,348 | A | * | 7/1976 | Maskery .................. 303/22.7 |
| 4,093,161 | A | * | 6/1978 | Auer, Jr. ...................... 246/5 |
| 4,226,306 | A | * | 10/1980 | Schafer .................... 188/170 |
| 4,692,867 | A | * | 9/1987 | Poole ........................ 701/70 |
| 5,072,900 | A | * | 12/1991 | Malon .......................... 246/5 |
| 5,700,072 | A | * | 12/1997 | Cook et al. ................ 303/135 |
| 5,833,325 | A | * | 11/1998 | Hart ............................ 303/7 |
| 6,353,780 | B1 | * | 3/2002 | Hart .......................... 701/20 |
| 6,487,478 | B1 | * | 11/2002 | Azzaro et al. ............... 701/24 |
| 6,991,301 | B2 | * | 1/2006 | Aurich et al. .............. 303/15 |
| 7,353,101 | B2 | * | 4/2008 | Phillips ...................... 701/70 |
| 7,395,141 | B1 | * | 7/2008 | Seck et al. .................. 701/19 |
| 7,826,952 | B2 | * | 11/2010 | Disser et al. ............... 701/70 |
| 7,922,127 | B2 | * | 4/2011 | Kumar et al. ............. 246/28 R |
| 2004/0015281 | A1 | * | 1/2004 | Weiberle ................... 701/70 |
| 2008/0015745 | A1 | | 1/2008 | Gaegauf et al. |
| 2008/0054718 | A1 | * | 3/2008 | Nishino et al. ............. 701/97 |
| 2008/0154452 | A1 | | 6/2008 | Kapp et al. |
| 2008/0167767 | A1 | | 7/2008 | Brooks et al. |
| 2009/0210154 | A1 | * | 8/2009 | Willis et al. .............. 701/210 |
| 2010/0114407 | A1 | | 5/2010 | Klooster et al. |
| 2010/0318247 | A1 | | 12/2010 | Kumar |
| 2010/0319565 | A1 | | 12/2010 | Mobasher |
| 2012/0192757 | A1 | * | 8/2012 | Schiffers et al. ............. 105/1.4 |

OTHER PUBLICATIONS

Burt, H.G.P., et al., "Microprocessor Control of Wheel Slip," IEEE, 1985, pp. 19-28.

* cited by examiner

METHOD AND APPARATUS FOR CONTROLLED BRAKING IN FIXED GUIDEWAY TRANSPORTATION SYSTEMS

CROSS-REFERENCE TO RELATED APPLICATIONS

The present application is a continuation-in-part of U.S. patent application Ser. No. 13/218,422, filed Aug. 25, 2011. The present application is also a continuation-in-part of U.S. patent application Ser. No. 13/218,423, filed Aug. 25, 2011. The present application is also a continuation-in-part of U.S. patent application Ser. No. 13/218,429, filed Aug. 25, 2011. The present application is also a continuation-in-part of U.S. patent application Ser. No. 13/218,434, filed Aug. 25, 2011. The present application also claims priority to U.S. Provisional Application No. 61/459,247, filed Dec. 10, 2010. The contents of all such applications are incorporated herein by reference in their entirety.

FIELD OF THE INVENTION

The present invention relates to fixed guideway transportation systems, and more particularly to controlled braking mechanisms and operating methods thereof for use in such systems.

BACKGROUND OF THE INVENTION

Modern mass rapid transit rail systems are very effective carriers of people. They are generally grade separated systems to enable vehicles to operate unaffected by automobile traffic, and thereby are able to achieve traffic densities otherwise unachievable. They are, however, very expensive. A typical, but conservative order of magnitude system capital cost for a system is approximately $100 million per bi-directional track mile of system, making it difficult for all but the largest and/or most affluent communities and cities to justify and/or afford the cost of new construction. This limitation has the effect of constraining the reach of these systems, and thus limiting the convenience to the users who can only ride the systems to the few locations to which guideway has been constructed. This results in a classic case of Catch 22. The high cost of systems requires a high ridership to justify the cost. However, high guideway costs limit construction and thus the reach of fixed guideway systems. This limits convenience to the riders, making it difficult to achieve the high ridership needed to justify the high cost.

Conventional mass rapid transit rail technology attempts to improve the ratio of benefits per unit cost by focusing on serving the commuting public. This means building systems to achieve very high passenger capacities to major employment centers. An example conventional system is shown in FIG. 1. As shown, conventional systems 110 achieve high capacities by building heavy infrastructure and operating long heavy trains 112 that typically carry a large number of riders to the few large employment centers that they can most effectively service, while bypassing smaller towns or communities. This, however, requires very costly guideway 122 and station structures 124, which limits the system's reach and thus convenience for the users, especially for those who want to travel to the generally more widely distributed retail, residential, or recreational destinations.

With guideway 122 and station structures 124 that must be built to handle long heavy trains 112 to support demand during commute hours, the result is an expensive but marginally justifiable solution for commute hour travel which is far too expensive to justify for other periods of the day and other destinations.

Other existing transportation systems that aim to be less expensive to build and operate include automated people mover (APM) systems, such as those operating in many modern airports and some cities. These systems are low speed/low capacity systems that operate driverless vehicles at speeds in the range of 25 to 30 mph and achieve line capacities in the range of 2,000 to 3,000 passengers per hour per direction. Given the limited speed and capacity of these systems, even with the somewhat lower cost of construction due to the use of smaller vehicles, the benefit per cost is still poor. Furthermore, with the lower speeds and line capacities, these systems are limited in utility to local service routes.

Another type of transportation system that has been discussed is called "personal rapid transit" (PRT). PRT's differ from the more common APM systems in that these systems are built with offline stations which allow higher traffic densities to be achieved. Typically these systems operate driverless cars that seat four to six people and can provide service on a personal demand-driven basis. However, with the very small cars, high speeds are difficult to achieve and line capacities are severely restricted. There is one PRT that is operating at West Virginia University, the Morgantown PRT, which is an 8.2 mile long system having cars that seat 20 people. With a claim of 15 second headways, a line capacity of 4,800 passengers per hour per direction can be achieved. With rubber-tired vehicles, however, the top speed of the system is 30 mph thus limiting its applicability to low speed local service lines.

Co-pending application Ser. No. 13/218,422, the contents of which are incorporated by reference in their entirety, dramatically advanced the state of the art by providing a fixed guideway transportation system that can overcome many of the above and other challenges of the prior art. For example, the system of the co-pending application includes driverless vehicles carrying 10 to 30 persons designed for optimal ratio of benefits per cost. However, certain challenges remain.

For example, in order to cost effectively build and operate a system that operates smaller vehicles such as those contemplated by the co-pending application, yet achieves line capacities that justify the cost of constructing track infrastructures, the density of traffic that can be achieved needs to be sufficiently high. That means that safe operating headways must be made smaller than those achievable with conventional control systems that represent today's state of the art. Furthermore, these safe operating headways should be achieved at mass rapid transit speeds (at least 60 mph). This cannot be achieved with current systems.

Safe operation further requires that vehicles must always be able to stop before arriving at obstacles on the track. With all track geometries (i.e. grade, track curvature) being equal, the greatest restriction will occur where there are fixed obstacles (i.e. zero speed obstacles) in the path of the vehicle. Therefore, in order to achieve high traffic densities, it is desirable to eliminate the existence of fixed location obstacles on the track, such as switch points between tracks.

Relatedly, since a collision between two vehicles is a life-threatening event, control functions that prevent collisions are critical to safety. In the rail industry, control that is critical to safety must be designed and implemented to a standard commonly referred to as "vital." In recent years achieving vital status has required an analytical demonstration of a Mean Time Between Unsafe Event or Hazard (MTBH) of $10^9$ hours or greater. Accordingly, any methodology aimed at increasing traffic density by removing fixed obstacles such as track switches should include collision protection satisfying this standard.

Furthermore, the impact of the conventional "brick wall criteria" on capacity is non-linear with the impact increasing rapidly at speeds that exceed about 15 mph. The reason for this is because headway is conventionally calculated as the time separation between the nose of the leading car to the nose of the trailing car so that the calculated headway can be simply converted to line capacity (vehicles per hour) by dividing the number of seconds in an hour by the headway measured in seconds. Determining headway is thus performed by calculating the time required for the trailing vehicle to traverse headway distance, the sum of the safe separation following distance and the length of the leading vehicle.

At low speeds, the length of the leading vehicle, a fixed length, can be large relative to the separation distance. Thus as the speed increases, the time to travel the headway distance becomes shorter. However, as the speed increases, the separation following distance becomes the predominant component of the headway distance since this distance increases with the square of the velocity. The headway, which is calculated by dividing the headway distance by the velocity of the trailing vehicle, thus increases roughly linearly with velocity.

A need remains, therefore, for enabling technologies that permit greater headways at higher speeds, while insuring against collisions between vehicles in compliance with required vital criteria.

SUMMARY OF THE INVENTION

The present invention relates generally to ground transportation systems, and more particularly to a fixed guideway transportation system that achieves a superior cost benefit ratio, is lower in net present cost and thus more easily justified for lower density corridors, and can provide passenger carrying capacities appropriate for higher density corridors serviced by mass rapid transit systems today. According to certain aspects, the present invention provides a braking control system and methodology that enables the implementation of related systems and methods that achieve safe headways at higher speeds than conventionally possible, while maintaining collision avoidance capabilities that support necessary MTBH criteria. In embodiments, a brake assembly for an axle of a vehicle provides redundancy and load-sharing such that failures are guaranteed to not occur above required safety criteria. According to further aspects, the invention provides methods for controlling the redundant and independent braking units on each axle of a vehicle in a manner that guarantees a brake rate within a desired range.

In accordance with these and other aspects, a braking apparatus according to embodiments of the invention includes a plurality of braking mechanisms coupled to a single axle of a vehicle; a plurality of controllers that respectively and independently control the braking mechanisms; and a bus for communicating information between the plurality of controllers, wherein the plurality of controllers are configured to collectively control operation of the braking mechanisms to cause a targeted braking rate for the vehicle.

In further accordance with these and other aspects, a braking method for a vehicle according to embodiments of the invention includes coupling a plurality of braking mechanisms to a single axle of the vehicle; respectively coupling a plurality of controllers to independently control the braking mechanisms; communicating information between the plurality of controllers; and configuring the controllers to collectively control operation of the braking mechanisms to cause a targeted braking rate for the vehicle.

In still further accordance with these and other aspects, a method of controlling movement of vehicles in a system according to embodiments of the invention includes providing controllers in braking apparatuses in each of the vehicles; configuring the controllers to cause a targeted braking rate for each of the vehicles based on a command from a master controller; monitoring separation between the vehicles; and generating the command based on the monitored separation and the targeted braking rate.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
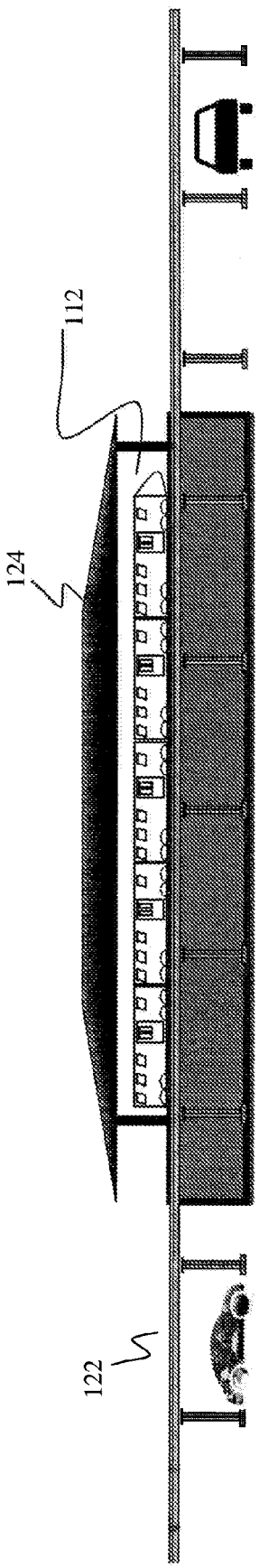
FIG. 1 illustrates a conventional mass transit system.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the invention of the co-pending application enables the construction of rail lines that: 1. achieve a superior amount of benefits per cost; 2. are lower in cost and thus more easily justified for lower density corridors; and 3. can provide passenger carrying capacities appropriate for higher density corridors serviced by mass rapid transit systems today.

In certain embodiments, these objectives are met by utilizing smaller vehicles that can operate on a less expensive infrastructure. Using certain methods according to the co-pending application, the costs of fixed guideway mass rapid transit systems are reduced, allowing more destinations to be accessed. Also, with certain methods according to the co-pending application, the same structures appropriate for low ridership corridors and/or service hours can be used to achieve passenger carrying capacities needed for the high capacity corridors served today by modern mass rapid transit systems.

According to further aspects, the invention of the co-pending application improves the amount of benefits per cost of rail transit by reducing the cost to levels more justifiable for low density corridors. To be meaningful, certain methods according to the co-pending application achieve improved benefits per cost in a holistic manner, in other words, by reducing the net cost of ownership which includes not only the cost of equipment but also the net cost of operating and maintaining the system.

Although the principles of the inventions of the co-pending application and the present application will be explained in connection with applications to conventional diesel and/or electrified rail systems, the invention is not limited to these types of systems. For example, the principles of the invention can be extended to conventional and other vehicle technologies that do not rely on steel wheels rolling on steel rail.

According to certain aspects, the present invention improves upon the invention of the co-pending application by providing braking control systems and methods that achieve a targeted braking rate within a predetermined margin. These braking control systems and methods can be used together with systems and methods for achieving improved headways between moving vehicles, and with improved systems and methods for maintaining safe separation distances and avoiding collisions.

Figure 2:
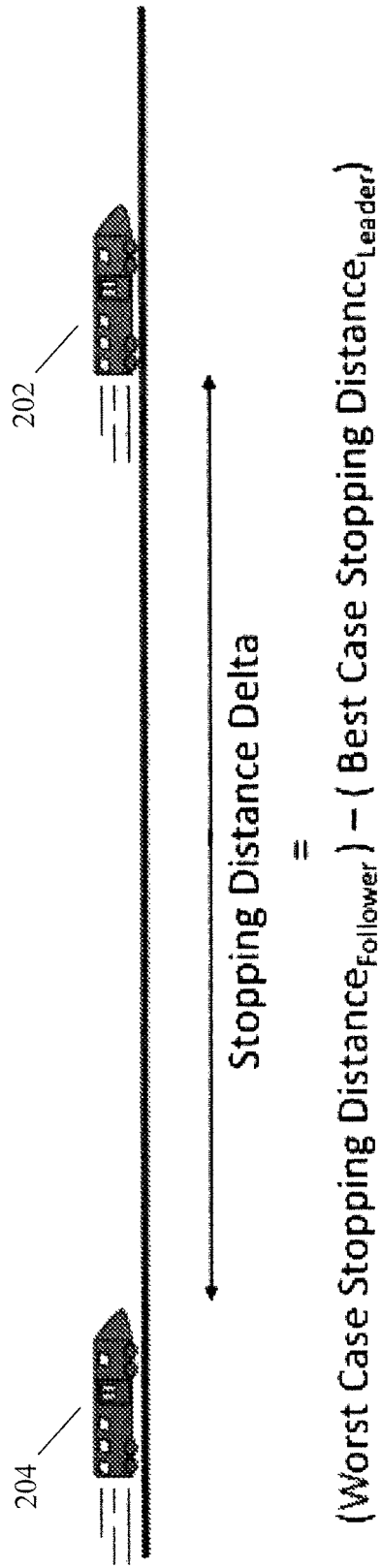
FIG. 2 illustrates an example method of providing dynamic block control in a fixed guideway transportation system according to aspects of the invention.

According to certain additional aspects, the present invention builds upon and provides enabling technology for implementing a dynamic block control system as described in co-pending application Ser. No. 13/218,429. A system and method described in that application achieves higher traffic densities by using communication based train control system that takes into consideration the dynamic state of all vehicles when determining a safe separation distance between them. For example, as shown in FIG. 2, the system and method of the co-pending application constantly determines a stopping distance delta between a leading 202 and following vehicle 204 that considers the worst case stopping distance of the following vehicle 202 and the best case stopping distance of the leading vehicle 204. According to further aspects, the stopping distances of the vehicles 202, 204 can both be computed based on a targeted braking rate achieved by the present invention.

According to still further aspects, the present invention builds upon and provides enabling technology for implementing a collision avoidance system and method as described in co-pending application Ser. No. 13/218,434. A system and method described in that application achieves improved headways even at high speeds by periodically determining whether there are any safety violations in the system, and withholding transmission of a safety signal to certain vehicles in the system if there is a violation. The periodic determination of safety violations can assume a targeted braking rate achieved with methods and devices according to the present invention.

The present inventors recognize that traditional approaches to collision avoidance assume the use of failsafe emergency braking as the singular, "always safe" response to detected unsafe situations. Emergency braking equipment is designed to achieve a brake rate typically referred to as the guaranteed minimum achievable braking rate which is selected in large measure by the predicted available adhesion between the wheel (e.g. made of steel) and the rolling surface (e.g. rails made of steel). This braking rate is determined by collecting large volumes of field data on the system to be controlled and the control system is then designed to be failsafe with vehicle protection logic that makes the assumption that the trailing vehicle will always brake at a rate that is greater than the guaranteed minimal achievable braking rate when emergency braking is called upon. No assumption is made, however, as to the guaranteed maximum achievable braking rate of the leading vehicle, meaning that the logic assumes an upper braking rate of infinity for the leading car. Thus the basic premise of all past control systems is that it is always safe to brake as hard as is possible when unsafe situations are detected.

Meanwhile, in addition to avoiding collisions, the present inventors recognize that emergency braking on a vehicle can be implemented in a way that ensures that, with a very high level of reliability, the braking system will achieve a target brake rate plus or minus a small control error. For transit applications where the standard of safety is often expressed as a Mean Time Between Unsafe Failure (MTBUF), the level of reliability should exceed the required system MTBUF. According to certain aspects, the present invention provides a methodology for achieving this required level of reliability. This methodology is described in the following sections and achieves Vital Fail Operational Braking. The resulting system will be referred to herein as a Fail Operational Braking System (FOBS). An emergency braking control system and methodology that can use the braking system of the present invention is described in more detail in co-pending application Ser. No. 13/316,402.

At least two different aspects of the invention will now be described. First there is the approach to mechanical redundancy that achieves the required level of safety/reliability. Second there is a methodology for controlling independent and redundant braking elements to target a selected braking force.

As to the first aspect, it should be recognized that a level of reliability that would qualify the system as being acceptable for safety, is a Mean Time Between a Unsafe Failure (MTBUF) greater than $10^9$ hours. Since individual physical components cannot be designed to have rates of failure which approach such a low rate, any system designed to achieve the MTBUF criteria would have to rely on redundancy for the safety critical functions.

Determining the MTBUF of a system that relies on redundancy for safety starts with determining the probability of occurrence of "concurrent" subsystem failures that can put the system in an unsafe state. Assume for this discussion that the failed/unfailed state of each subsystem can be checked every time interval, $\tau_{check}$. Then, if one can compute the probability of failure $P_{one\ subsystem}$ during time $\tau_{check}$ of one of n identical and independent subsystems that must fail before the system enters an unsafe state, the unsafe probability $P_{unsafe}$, which is the probability of n of these subsystems failing during a time interval $\tau_{check}$, can be approximated as:

$$P_{unsafe} = (P_{one\ subsystem})^n$$

To determine the probability that a given braking unit will fail during a time interval $\tau_{check}$, the discussion can start with the reliability function, $R(t) = e^{-\lambda \times t}$ which gives the probability that a component will be functional given a predicted failure rate $\lambda$ and a time interval t. The probability $P(\lambda, t)$, which is the probability that a component with failure rate λ, fails during time t, can be expressed as:

$$P(\lambda,t)=1-(e^{-\lambda \times t})$$

For small values of λ×t, this expression simplifies to:

$$P(\lambda,t)=\lambda \times t$$

Note that for λ×t as large as $10^{-1}$, the error in this estimation is no more than 0.5%. Smaller values of λ×t yield even smaller errors. For larger values of λ×t up to 1, the estimation error becomes excessively large in the positive direction which in turn will yield MTBH computation results that are conservative, i.e. lower than what they should be.

Given n redundant brake units, the probability $P_{failure}$ that all n will fail during the same time interval, $\tau_{check}$, where $\lambda_{one\ brake\ unit}$ is the predicted failure rate of just one unit, can be approximated as:

$$P_{failure}=(\lambda_{one\ brake\ unit} \times \tau_{check})^n$$

A reasonable and believable failure rate for any subsystem consisting of hardware components might be in the range of $10^{-4}$ failures per hour (i.e. fails once per year). If the assumption is made that the functional state of each braking unit can be checked once every hour, and that upon detection of failure, the vehicle can be removed from service, a value of n=3 yields an unsafe failure probability on the order of $10^{-12}$. Thus a system designed to operate safely until three concurrent (i.e. during the same hour) failures occur would achieve a level of safety that exceeds the required criteria of one unsafe failure of the vehicle every $10^9$ hours.

To demonstrate how such a vehicle braking system might be designed, one possible design is discussed below in connection with FIG. 3. This sample design is a mechanically oriented embodiment of the methods described in the present disclosure and is only one possible implementation. It is provided here to clearly and readily illustrate certain general aspects and concepts of the invention and is not meant to be limiting. For example, although the below design shows multiple calipers on a brake disc, other ways of achieving redundancy and other types of braking mechanisms are possible, such as redundant dynamic braking units for each axle.

Figure 3:
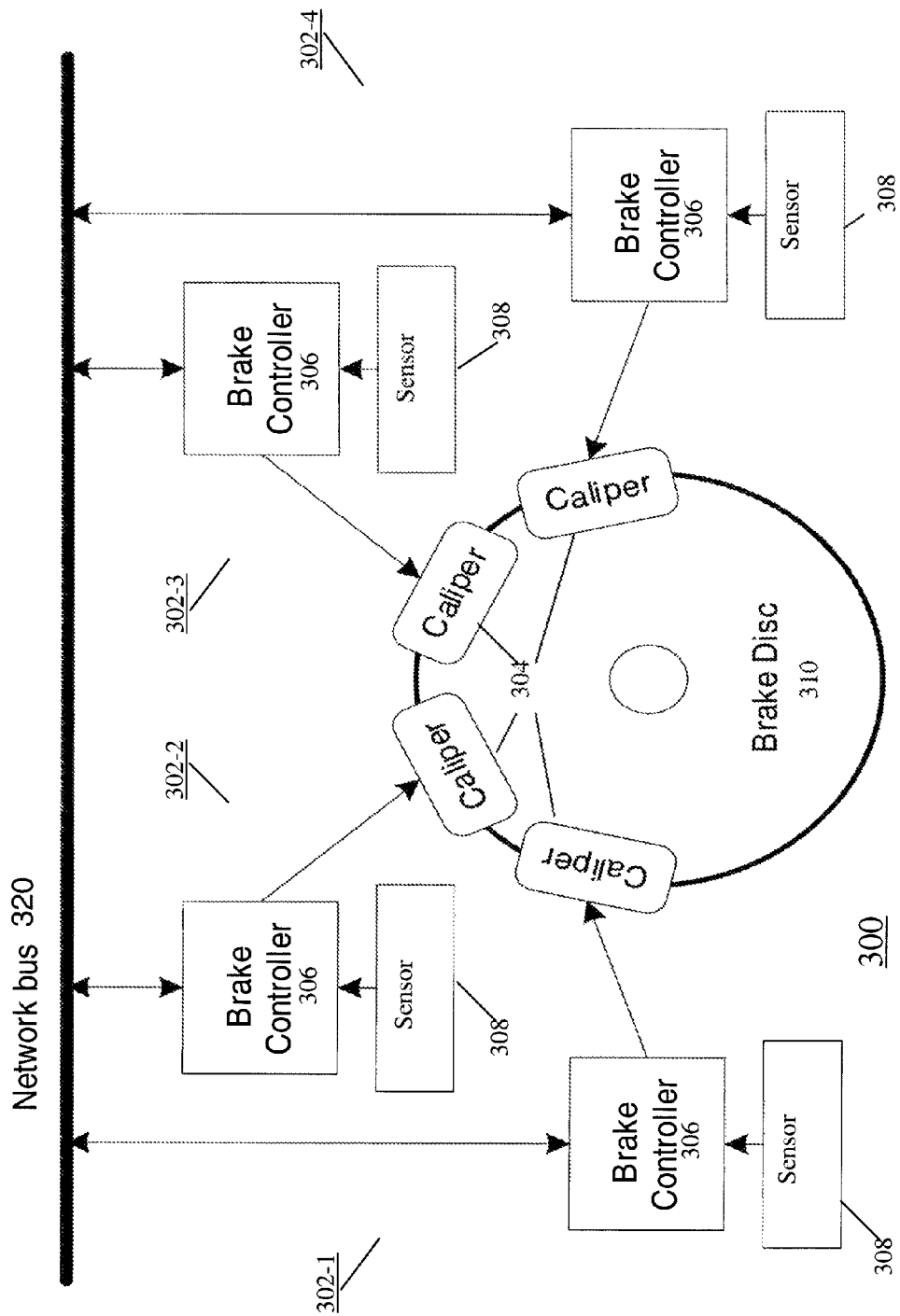
FIG. 3 is a block diagram illustrating an example braking system that provides controlled braking for a vehicle in a fixed guideway system according to embodiments of the invention.

FIG. 3 illustrates an example of a braking assembly for one axle of a two-axle vehicle according to embodiments of the invention. In this example, the braking assembly 300 for each axle includes four independent braking units 302-1 to 302-4. Each braking unit 302 consists of a brake caliper 304 and a dedicated controller 306 designed to control the brake pressure applied by the brake caliper to a brake disk 310 on the axle.

As further shown in FIG. 3, each controller 306 has a sensor 308 capable of measuring the net effect on the vehicle of all functioning braking units. During emergency braking, the control loop implemented by controller 306 attempts to achieve a target deceleration rate in the longitudinal direction (back to front) along a line parallel to the running surface of the vehicle, increasing brake pressure when the target rate is not being achieved or decreasing brake pressure if too much braking is being achieved. An example method of implementing this control loop will be described in more detail below.

In embodiments, each controller 306 is implemented by a conventional microprocessor and/or microcontroller having associated firmware and software programmed at least with the control loop and communication functionality to be described in more detail below. Each sensor 308 can be implemented in a multiplicity of ways. For example, one approach would be to measure the net force acting on the vehicle at any point in time, including the effects of gravity. This can be achieved by a simple pendulum accelerometer, which is a pendulum assembly mounted to swing along a line parallel to the direction of travel with electronic sensors to measure and report on the position of the pendulum. Another approach would be to use vehicle position and/or speed sensors to provide vehicle movement data from which acceleration (dv/dt) can be calculated. Still another approach would be to use a MEMS device designed to work in Inertial Guidance Systems (IGS) to detect and provide 3-axis acceleration values to controller 306. The performance of the system will thus possibly be affected by the chosen implementation. Those skilled in the art will be able to appreciate various implementation details of these and other similar components after being taught by the present examples.

In embodiments, each brake unit 302 is capable of providing half the braking force required on the axle of a fully loaded vehicle. Therefore, even if only two of the four braking units 302 on an axle are functional, the target brake rate will be achievable. Furthermore, under failure conditions, each unit 302 is designed to be incapable of supplying any more than this force. In embodiments, each braking unit is truly independent and each includes battery backed power supplies that make each capable of operating through at least one, and preferably a number of braking cycles.

Finally, each element of the array of eight braking units 302 in a two-axle vehicle is tied to data communication bus 320. This bus 320 is used to provide Safe to Proceed (STP) commands to each braking unit which are needed to periodically withhold emergency braking, as described in more detail in co-pending application Ser. No. 13/316,402. As more fully described in the co-pending application, loss of this command causes each unit 302 to independently initiate emergency braking. Moreover, via this bus 320, each controller 306 provides its failed/non-failed state to each the other controllers 306 and to a master controller. In addition, each controller can put an indication on the bus 320 that indicated the Brake ON/OFF status for the controller. This information can be transmitted back to the station to allow the station to monitor which of the controllers are responding correctly to commands from the station, as described in more detail in co-pending application Ser. No. 13/316,402.

Bus 320 can be implemented using any known inter-processor or inter-controller communication protocols and structures such as PCI, etc. It should be noted that braking system 300 and/or bus 320 can be coupled to and/or incorporated into overall vehicle control functionality that includes control communications with a station controller that provides dynamic block control, such as that described in co-pending application Ser. No. 13/218,429.

The mechanical specifications of braking system 300, including the components and capabilities of disc 310 and calipers 304 can depend on the size of the associated vehicle, as well as the type of fixed guideway and the maximum targeted braking rate. The following discussion provides design considerations in connection with an example implementation of a vehicle in a fixed guideway system using steel wheels on steel rails. Those skilled in the art will understand how to design appropriate braking systems, including disc 310 and calipers 304, for such an example implementation, as well as for alternative implementations, after being taught by the following principles.

In the Bay Area Rapid Transit (BART) system, each 60,000-pound (27,272 kg) vehicle assumes a maximum passenger load of 30,000 pounds (13,636 kg). In embodiments of the invention having vehicles sized as described in co-pending application Ser. No. 13/218,422, which are about one quarter the size of the BART vehicle, this would scale to a 6,818 kg vehicle with a maximum passenger load of 3,409 kg giving a total loaded vehicle mass of 10,227 kg. Assuming the same adhesion levels as those assumed for the BART vehicle, a deceleration rate of only 1.5 mphps (0.671 meters/sec/sec) can be guaranteed on flat track. The braking system must therefore be sized and capable of providing enough force to achieve the 0.671 mps² braking rate with a vehicle having a mass of 10,227 kg.

Since by definition, one Newton is the force required to accelerate or decelerate a mass of one kg at a rate of one meter per second per second (mps²), the force required to achieve a 0.671 mps² deceleration for a one kg vehicle is 0.671 Newton. For a vehicle with a mass of 10,227 kg, the force required is therefore:

$$\text{Force}_{full} = 10{,}227 \text{ kg} \times 0.671 \text{ mps}^2$$
$$= 6{,}862 \text{ N}$$
$$\sim 6{,}860 \text{ N}$$

For an empty vehicle, the mass that must be decelerated is only 6,818 kg, so the force required to achieve the 0.671 mps² deceleration rate is reduced to:

$$\text{Force}_{empty} = 6{,}818 \text{ kg} \times 0.671 \text{ mps}^2$$
$$= 4{,}574 \text{ N}$$
$$\sim 4{,}570 \text{ N}$$

In the example braking system described above, there are two axles per vehicle so the required braking effort can be shared between the two axles. Furthermore, because there are four brake units on each axle, each brake unit 302 only needs to provide one-eighth of the total effort. Thus, on a fully functional, fully loaded vehicle according to the co-pending application, each brake caliper 304 would be called upon to provide ~6,860÷8=857.5 N of force. It should be noted that, in this case, force is the braking force generated at the wheel to rail interface in a non-adhesion limited situation. When a braking unit fails, however, and is either unable to apply any braking force or begins to apply the maximum available braking force, then the other functional brake units 202 adjust their brake pressures to achieve the target brake rate of 0.671 mps². Furthermore, by design, the maximum force a single brake caliper 204 can contribute to the braking effort is 50% of the force required on one axle to brake a fully loaded vehicle, or 1,715 N.

For this system design, the possible failure configurations pertinent to this discussion are summarized below, and in Table 1 for a fully loaded vehicle and Table 2 for an empty vehicle. A discussion of each case follows.

Fully Loaded Vehicle:

Case 1—All braking units functional and share the braking effort evenly. Since 6,860 N of force are needed, each braking unit contributes 858 N.

Case 2—Two braking units on the same axle fail and produce no braking force. Since the failures are on the same axle, the two functioning brake units on the axle with the failed units must each provide 1,715 N of force to bring the total force on the axle with the failures to 3,430 N and 6,860 N for the whole vehicle.

Case 3—Two braking units on different axles fail and produce no braking force. Since the failures are on different axles, the functional braking units on both axles must increase the braking force to 1,143 N to compensate and maintain the total braking force for each axle at 3,429 N and for the whole vehicle at 6,860 N.

Case 4—Two braking units on the same axle fail and produce the maximum braking force possible (1,715 N) for each braking unit. Since the failures are on the same axle, the two functioning brake units on the axle with the failed units must reduce their contribution to the braking force to 0 N to bring the total force on the axle with the failures to 3,430 N and 6,860 N for the whole vehicle.

Case 5—Two braking units on different axles fail and produce the maximum braking force possible (1,715 N) for each braking unit. Since the failures are on different axles, functional braking units on both axles must decrease the braking force to 572 N to compensate and maintain the total braking force for each axle at 3,430 N and for the whole vehicle at 6,860 N.

Empty Vehicle

Case 1—All braking units functional and share the braking effort evenly. Since 4,570 N of force are needed, each braking unit contributes 571 N.

Case 2—Two braking units on the same axle fail and produce no braking force. Since the failures are on the same axle, the two functioning brake units on the axle with the failed units must each provide 1,143 N of force to bring the total force on the axle with the failures to 2,285 N and 4,570 N for the whole vehicle.

Case 3—Two braking units on different axles fail and produce no braking force. Since the failures are on different axles, the functional braking units on both axles must increase the braking force to 762 N to compensate and maintain the total braking force for each axle at 2,285 N and for the whole vehicle at 4,570 N.

Case 4—Two braking units on the same axle fail and produce the maximum braking force possible for each braking unit. Since the failures are on the same axle, the two functioning brake units on the axle with the failed units must reduce their contribution to the braking force to 0 N. In this case, however, even with the two functioning units reducing their contribution to 0 N, the failed units will provide 3,430 N of force which is more than the required 2,285 N. On clean dry track in a situation where the braking is not adhesion limited, the axle with the failed brake units will provide 3,430 N of the total of 4,570 N required for the vehicle. Therefore, in a non-adhesion limited situation, the four good brake units on the other axle must compensate and reduce their force such that each brake provides one fourth of the remaining balance, or 285 N which will then cause the vehicle to brake at a 0.671 mps² rate.

Note, however, that each axle/wheel set can only guarantee sufficient adhesion to achieve one half of the 0.671 mps² brake rate or 0.336 mps². Therefore, even with an applied force that is greater than the required 2,285 N, only a 0.336 mps² brake rate can be guaranteed if this were the only axle providing braking force. In such a case, the braking units on the axle with all units functioning would need to provide a total of 2,285 N of force so each braking unit would provide 571 N of force which would achieve a brake rate of 0.671 mps² for the vehicle.

Case 5—Two braking units on different axles fail and produce the maximum braking force possible (1,715 N) for each braking unit. Since the failures are on different axles, braking units on both axles must decrease the braking force to 190 N to compensate and maintain the total braking force for each axle at 2,285 N and for the whole vehicle at 4,570 N.

Tables 1 and 2 provide a summary of each of the above cases.

TABLE 1

Fully Loaded Vehicle
(Total Braking Force Required = 6,860 Newtons)

| Axle | Braking Unit | Case 1 All Braking Units Functional | Case 2 Two Braking Units (A1 & A2) Fail and Provide No Braking Force | Case 3 Two Braking Units (A1 & B1) Fail and Provide No Braking Force | Case 4 Two Braking Units (A1 & A2) Fail and Provide Max Braking Force | Case 5 Two Braking Units (A1 & B1) Fail and Provide Max Braking Force |
|---|---|---|---|---|---|---|
| A | A1 | 858N | 0N* | 0 lbs* | 1,715N* | 1,715N* |
|   | A2 | 858N | 0N* | 1143N | 1,715N* | 572N |
|   | A3 | 858N | 1,715N | 1143N | 0 lbs | 572N |
|   | A4 | 858N | 1,715N | 1143N | 0 lbs | 572N |
| B | B1 | 858N | 858N | 0 lbs* | 858N | 1,715N* |
|   | B2 | 858N | 858N | 1143N | 858N | 572N |
|   | B3 | 858N | 858N | 1143N | 858N | 572N |
|   | B4 | 858N | 858N | 1143N | 858N | 572N |
| Total A & B | | ~6,860N | ~6,860N | ~6,860N | ~6,860N | ~6,860N |

*Indicates failed braking unit

TABLE 2

Empty Vehicle
(Total Braking Force Required = 4,570 Newtons)

| Axle | Braking Unit | Case 1 All Braking Units Functional | Case 2 Two Braking Units (A1 & A2) Fail and Provide No Braking Force | Case 3 Two Braking Units (A1 & B1) Fail and Provide No Braking Force | Case 4 Two Braking Units (A1 & A2) Fail and Provide Max Braking Force | Case 5 Two Braking Units (A1 & B1) Fail and Provide Max Braking Force |
|---|---|---|---|---|---|---|
| A | A1 | 571N | 0N* | 0N* | 1,715N* | 1,715N* |
|   | A2 | 571N | 0N* | 762N | 1,715N* | 190N |
|   | A3 | 571N | 1143N | 762N | 0N | 190N |
|   | A4 | 571N | 1143N | 762N | 0N | 190N |
| B | B1 | 571N | 571N | 0 lbs* | 285 to 571N | 1,715N* |
|   | B2 | 571N | 571N | 762N | 285 to 571N | 190N |
|   | B3 | 571N | 571N | 762N | 285 to 571N | 190N |
|   | B4 | 571N | 571N | 762N | 285 to 571N | 190N |
| Total A & B | | ~4,570N | ~4,570N | ~4,570N | ~4,570N | ~4,570N |

*Indicates failed braking unit

It should be noted that Case 4 for an empty vehicle is the only case where an axle has an excessive brake force, which may cause sliding. This is because the two failed units on Axle A provide 2×1,715=3,430 N of force which is greater than the required 2,285 N on this axle. If axle A does not slip, then axle B will reduce the applied brake force.

One point to be noted in the above discussion is that in all cases, until three or more brake units fail, the target brake rate can be achieved. Since not achieving the target brake rate is the unsafe failure mode of concern, three failures are required before the vehicle becomes unable to maintain the required safe target brake rate.

It was further demonstrated above that given three elements, the probability that all three would fail during a time period $\tau_{check}$ could be approximated as $(\lambda_{one\ brake\ unit} \times \tau_{check})^3$. For the design discussed, however, there are eight independent braking units 302 of which three failing will result in an unsafe state. Thus the unsafe failure probability for the vehicle $P_{unsafe}$ is the sum of the failure rates for each of the combinations that produce an unsafe state.

$P_{unsafe}$ = Σ Probability of each unsafe combination of failures
= # of combinations × Probability of occurrence of each combination The number of unsafe combinations is computed using the expression:

$$\text{Number of combinations of } K \text{ objects selected from } n \text{ objects} = \binom{n}{k} = \frac{n!}{(n-k)! \times k!}$$

Thus, for a system that is unsafe when 3 of 8 subsystems fail, the unsafe probability becomes:

$$P_{unsafe} = \binom{8}{3} \times [\lambda_{one\ unit} \tau_{check}]^3$$

$$= \frac{8!}{(8-3)! \times 3!} \times [\lambda_{one\ unit} \times \tau_{check}]^3$$

$$= 56 \times [\lambda_{one\ unit} \times \tau_{check}]^3$$

Using a conservative failure rate for each braking unit of $\lambda_{one\ unit} = 10^{-4}$ per hr. and a check interval $\tau_{check}$=one hour (i.e. check once per trip or station stop), we arrive at an unsafe probability of failure during one hour of operation of:

$$P_{unsafe} = 56 \times 10^{-12}$$

If the probability of being unsafe during one hour of operation is $56 \times 10^{-12}$, we can then compute the MTBH as:

| MTBH | = | $(P_{unsafe})^{-1}$ |
|---|---|---|
|  | = | $1.78 \times 10^{10}$ hours |

This exceeds the required MTBH criteria of $10^9$ by more than an order of magnitude.

The delta in the brake rates that must be assumed for the leading and following vehicle then becomes a function of the effectiveness of the control loop associated with each of the brake control units. Although a value will not be computed here, an error band of +/-3% to 5% should be reasonably achievable.

Returning to the system shown in FIG. 3, and turning to the second aspect of providing targeted braking rate control, one important requirement for this example embodiment is that the braking effort should be reasonably and substantially equally shared between the eight independent braking units 302. Since each unit 302 operates independently and the system preferably has no common mode failure mechanism, there can be no "braking manager" to balance the braking effort, as such a component would introduce a common mode of failure. In embodiments, therefore, the invention includes a control algorithm executed by controllers 306 that adds a dimension to the feedback control that makes the rate of change allowed for the brake pressure from each braking unit vary inversely with the current pressure being exerted by each unit. An explanation of how this can be achieved follows.

Assume that for each braking unit 302, brake controller 306 employs a feedback control algorithm that is a traditional PID controller. Then the braking effort for each of elements 302-1 through 302-4 would be represented by the equations:

$$F1 = K_P \varepsilon_1(t) + K_D \frac{d\varepsilon_1(t)}{dt} + K_I \int_0^t \varepsilon_1(t)dt$$

$$F2 = K_P \varepsilon_2(t) + K_D \frac{d\varepsilon_2(t)}{dt} + K_I \int_0^t \varepsilon_2(t)dt$$

$$F3 = K_P \varepsilon_3(t) + K_D \frac{d\varepsilon_3(t)}{dt} + K_I \int_0^t \varepsilon_3(t)dt$$

$$F4 = K_P \varepsilon_4(t) + K_D \frac{d\varepsilon_4(t)}{dt} + K_I \int_0^t \varepsilon_4(t)dt$$

Where F1 through F4 is the force exerted by each of the braking elements and $\varepsilon_1(t)$ through $\varepsilon_4(t)$ is the error (targeted brake rate minus the actual measured brake rate) measured by the sensor 308 associated with braking elements 302-1 through 302-4 respectively. $K_P$, $K_I$ and $K_D$ in these equations are the proportional, integral and differential gain constants associated with the well-known PID control algorithm, respectively.

Taking the PID equations and making each of the constants a function of the force commanded during the previous processing cycle time t-1 yields:

$$F1_t = K_P(F1_{t-1})\varepsilon_1(t) + K_D(F1_{t-1})\frac{d\varepsilon_1(t)}{dt} + K_I(F1_{t-1})\int_0^t \varepsilon_1(t)dt$$

$$F2 = K_P(F2_{t-1})\varepsilon_2(t) + K_D(F2_{t-1})\frac{d\varepsilon_2(t)}{dt} + K_I(F2_{t-1})\int_0^t \varepsilon_2(t)dt$$

-continued $$F3 = K_P(F3_{t-1})\varepsilon_3(t) + K_D(F3_{t-1})\frac{d\varepsilon_3(t)}{dt} + K_I(F3_{t-1})\int_0^t \varepsilon_3(t)dt$$

$$F4 = K_P(F4_{t-1})\varepsilon_4(t) + K_D(F4_{t-1})\frac{d\varepsilon_4(t)}{dt} + K_I(F4_{t-1})\int_0^t \varepsilon_4(t)dt$$

Where $\varepsilon_n(t)$ represents the error measured by the sensor for the nth braking element and, $K_x(Fn_{t-1})$ represents the gain, K, as a function of the force commanded during the previous processing cycle. The function $K(Fn_{t-1})$ is a function that yields a value of K that is inversely proportional to $Fn_{t-1}$. The relationship between K and $F_{t-1}$ can be linear or non-linear and is determined by experimentation to produce the most effective sharing of braking effort among the active braking units.

The above feedback function results in causing whichever braking element that is "behind" with respect to the others to have a higher rate of change, allowing it to catch up, while causing elements that are "ahead" to have a slower rate of change. By this approach, a braking unit that is already braking hard will not be able to continue increasing the braking force at a rate that is higher than the rate at which another unit, not yet braking as hard. Thus this algorithm will have the effect of preventing any individual braking unit from doing all of the work while the other units rest idle.

Those skilled in the art will understand how to implement a control algorithm in a conventional processor or controller using firmware or software that embodies controller 306, as well as using conventional signaling technology and sensor interfaces after being taught by the above descriptions.

A system that eliminates all fixed obstacles such as described in co-pending application Ser. No. 13/218,422, and that includes vehicles having a braking system that assures a guaranteed controlled brake rate such as that described above, can implement dynamic block control such as that described in co-pending application Ser. No. 13/218,429, as well as collision avoidance logic such as that described in co-pending application Ser. No. 13/218,434, which both rely on vehicles braking no more than or no less than the target brake rate plus or minus a small control error during emergency braking.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A braking apparatus for a fixed guideway vehicle, comprising:
a plurality of braking mechanisms coupled to a single axle of the vehicle;
a plurality of controllers that respectively and independently control the braking mechanisms; and
a bus for communicating information between the plurality of controllers,
wherein each of the plurality of controllers includes a feedback control function that independently monitors the combined operation of the braking mechanisms and determines error information for each of the braking mechanisms and combines the error information, the combined error information comprising a difference value between a targeted braking rate for the vehicle and an actual measured braking rate for the vehicle, and wherein each of the plurality of controllers uses the difference value in the error information from the feedback control function to independently calculate a braking force value to be applied by the respective braking mechanisms that will cause the targeted braking rate for the vehicle.

2. The braking apparatus according to claim 1, wherein a number and a braking capability of the plurality of braking mechanisms and controllers are selected to achieve an emergency braking rate for the vehicle despite failure of a predetermined number of the plurality of braking mechanisms and controllers.

3. The braking apparatus according to claim 2, wherein the selection is made in compliance with a targeted Mean Time Between Hazard (MTBH).

4. The braking apparatus according to claim 1, further comprising:
   a plurality of sensors independently and respectively coupled to the controllers, each of the sensors determining one or more characteristics of movement of the vehicle,
   wherein the controllers are configured to control operation of the braking mechanisms based at least partially on data from the sensors.

5. The braking apparatus according to claim 4, wherein the one or more characteristics include one or more of vehicle velocity and vehicle acceleration.

6. The braking apparatus according to claim 1, wherein the braking mechanisms are each capable of applying no more than 50% of the force required on one axle to brake a fully loaded vehicle.

7. The braking apparatus according to claim 1, wherein the error information includes a current difference between the targeted braking rate and the actual measured braking rate, and a current rate of change of difference between the targeted braking rate and the actual measured braking rate.

8. The braking apparatus according to claim 7, wherein the plurality of controllers use a proportional, integral and differential (PID) control algorithm to calculate the braking force using the current difference, current rate of change of difference and proportional, integral and differential gain constants.

9. A braking method for a fixed guideway vehicle, comprising:
   coupling a plurality of braking mechanisms to a single axle of the vehicle;
   respectively coupling a plurality of controllers to independently control the braking mechanisms;
   communicating information between the plurality of controllers;
   independently monitoring, by a feedback control function in each of the plurality of controllers, the combined operation of the braking mechanisms so as to determine error information comprising a difference value between a targeted braking rate for the vehicle for each of the braking mechanisms and combining the error information, the combined error information and an actual measured braking rate for the vehicle; and
   configuring each of the controllers to use the difference value in the error information from the feedback control function to independently calculate a braking force value to be applied by the respective braking mechanisms that will cause the targeted braking rate for the vehicle.

10. The braking method according to claim 9, further comprising:
    selecting a number and a braking capability of the plurality of braking mechanisms and controllers to achieve an emergency braking rate for the vehicle despite failure of a predetermined number of the plurality of braking mechanisms and controllers.

11. The braking method according to claim 10, wherein the selection is made in compliance with a targeted Mean Time Between Hazard (MTBH).

12. The braking method according to claim 9, further comprising:
    respectively coupling a plurality of sensors to the controllers, each of the sensors determining one or more characteristics of movement of the vehicle,
    wherein the controllers are configured to control operation of the braking mechanisms based at least partially on data from the sensors.

13. The braking method according to claim 12, wherein the one or more characteristics include one or more of vehicle motion and vehicle acceleration.

14. The braking method according to claim 9, further comprising configuring the braking mechanisms such that they are each capable of applying no more than 50% of the force required on one axle to brake a fully loaded vehicle.

15. A method of controlling movement of fixed guideway vehicles in a system, comprising:
    providing a plurality controllers for each of the respective braking apparatuses in each of the vehicles;
    configuring the controllers to cause a targeted braking rate for each of the vehicles based on a command from a master controller, wherein the controllers cause the braking apparatuses to apply a calculated amount of braking force that will cause the targeted braking rates for each of the vehicles, wherein the targeted braking rates are calculated based on a combined operation of the braking apparatuses for each vehicle and combined error information from the respective error information of each braking apparatus;
    monitoring separation between the vehicles;
    calculating the targeted braking rate based on the monitored separation;
    generating the command based on the calculated targeted braking rate; and
    calculating a stopping distance delta between the vehicles based on the monitored separation and the targeted braking rate, wherein calculating includes determining a best case stopping distance of a leading vehicle and the worst case stopping distance of a following vehicle whose path includes the leading vehicle.

* * * * *